(12) United States Patent
Ostroski et al.

(10) Patent No.: US 7,390,046 B2
(45) Date of Patent: Jun. 24, 2008

(54) ADJUSTABLE SEATING ASSEMBLIES FOR VEHICLES

(75) Inventors: Scott Ostroski, Roseau, MN (US); Roy Sunsdahl, Salol, MN (US); Scott Taylor, Blaine, MN (US)

(73) Assignee: Polaris Industries Inc., Medina, MN (US)

( * ) Notice: Subject to any disclaimer, the term of this patent is extended or adjusted under 35 U.S.C. 154(b) by 100 days.

(21) Appl. No.: 11/179,288

(22) Filed: Jul. 12, 2005

(65) Prior Publication Data

US 2007/0013203 A1      Jan. 18, 2007

(51) Int. Cl.
   *B60N 2/00*      (2006.01)
(52) U.S. Cl. .......................... 296/63; 296/69; 297/195.1
(58) Field of Classification Search ............... 298/17 R; 297/195.1, 215.1, 215.12; 224/413, 415; 296/63, 65.01, 65.16, 69
   See application file for complete search history.

(56) References Cited

U.S. PATENT DOCUMENTS

| | | | | |
|---|---|---|---|---|
| 878,889 | A * | 2/1908 | Miler | 297/352 |
| 1,033,156 | A * | 7/1912 | Conboy | 297/209 |
| 1,102,899 | A * | 7/1914 | Fox | 224/415 |
| 1,121,580 | A * | 12/1914 | Burkett et al. | 224/415 |
| 1,146,675 | A * | 7/1915 | Weed | 297/215.12 |
| 3,822,917 | A * | 7/1974 | George | 297/215.12 |
| 3,850,353 | A * | 11/1974 | Foulds | 224/418 |
| 3,887,231 | A * | 6/1975 | Bochynsky | 297/366 |
| 3,901,534 | A * | 8/1975 | Popken | 280/304.4 |
| 4,266,703 | A | 5/1981 | Litz | |
| 4,447,088 | A | 5/1984 | Bodlovic | 297/217 |
| 4,501,384 | A | 2/1985 | Itoh | |
| 4,570,998 | A * | 2/1986 | Hughes | 297/353 |
| 5,026,119 | A | 6/1991 | Frank et al. | 297/383 |
| 5,314,239 | A | 5/1994 | Edwards et al. | 297/352 |
| 5,765,917 | A | 6/1998 | Johnson | 297/352 |
| 5,997,088 | A * | 12/1999 | Stark et al. | 297/354.13 |
| 6,484,914 | B1 * | 11/2002 | Willey | 224/413 |
| 6,491,124 | B1 | 12/2002 | Thompson et al. | 180/190 |
| 6,502,728 | B2 | 1/2003 | Savant | 224/401 |
| 6,508,511 | B1 * | 1/2003 | Kolpin | 297/256.16 |
| 6,568,699 | B2 * | 5/2003 | McCann | 280/304.4 |

(Continued)

FOREIGN PATENT DOCUMENTS

CA          944326          3/1974

*Primary Examiner*—H Gutman
(74) *Attorney, Agent, or Firm*—Baker & Daniels LLP (57) ABSTRACT

A vehicle is provided having an adjustable seating assembly comprising one or more members. One member of the seating assembly can be adjusted to provide a backrest to a straddle type seat of the vehicle. As such, when a carrier bed having an accessory platform is located rearward of the straddle type seat, the one member can optionally be used to provide a wall portion of the carrier bed. The one member can also be adjusted to provide an extension to the straddle type seat. As such, when an accessory platform is located rearward of the straddle type seat, the one member can optionally be used to at least partially cover a segment of the accessory platform. When an accessory platform is located rearward of the straddle type seat, an additional member of the seating assembly can be adjusted to provide a backrest to one or more of the straddle type seat or an extended straddle type seat. The additional member can also be adjusted to form a segment of the accessory platform.

24 Claims, 7 Drawing Sheets

U.S. PATENT DOCUMENTS

| | | | |
|---|---|---|---|
| 6,659,547 B2 * | 12/2003 | Petersen | 297/215.1 |
| 6,705,680 B2 | 3/2004 | Bombardier | 298/17 |
| D488,746 S | 4/2004 | Rondeau et al. | D12/107 |
| D492,916 S | 7/2004 | Rondeau et al. | D12/107 |
| 6,767,053 B1 | 7/2004 | Crounse | 297/215.12 |
| 6,966,471 B1 * | 11/2005 | Wilson et al. | 224/413 |
| 6,968,917 B2 * | 11/2005 | Rondeau et al. | 180/89.1 |
| 6,983,992 B2 * | 1/2006 | Oomori | 297/357 |
| 7,011,240 B2 * | 3/2006 | Kan et al. | 224/413 |
| 7,121,371 B2 * | 10/2006 | Rondeau et al. | 180/89.1 |
| 7,131,691 B2 * | 11/2006 | Ziegler | 297/215.12 |
| 2004/0079561 A1 | 4/2004 | Ozawa et al. | |
| 2004/0173653 A1 | 9/2004 | Audet | |
| 2004/0222679 A1 | 11/2004 | Michisaka et al. | |

* cited by examiner

ADJUSTABLE SEATING ASSEMBLIES FOR VEHICLES

FIELD

The present invention relates to adjustable seating assemblies generally, and more specifically, to such systems being used on vehicles having straddle type seats.

BACKGROUND SECTION

Recreational and utility vehicles are becoming increasingly popular as a mode of transportation, particularly for various types of off-road activities. Seating systems for supporting people in a sitting position on such vehicles, for example, on ATVs, are well-known. Most systems generally involve a straddle type seat being secured to a frame structure. In some cases, the systems also include a generally vertical backrest immediately aft of the seat for additional comfort for the rider. Such vehicles are sometimes additionally equipped with a carrier bed of some type. In some cases, such carrier beds are integrally mounted at the rear of the vehicle, and specifically located rearward of the seat. The carrier beds generally include a horizontally disposed supporting area that is used in carrying various items, such as packages, containers, and/or other cargo.

Conventional straddle type seats on recreational and utility vehicles generally hold a fixed number of people. Most commonly, the seats function in supporting only a single person. However, vehicle seats that support two people are also known. Typically, two-person seating systems are designed with an elongated bench portion of the straddle type seat so as to support one person in front of the other. If a backrest is provided with such two-person seating systems, the backrest is generally located for use by the person in the rear position, so that the person in the front position must rely on the person in the rear position for back support.

It has been desirable on vehicles to have the option of supporting two people on a single seat, especially when dealing with a relatively small vehicle where space and weight capacity are limited. However, a vehicle with a conventional two-person seating system may be uncomfortable, inconvenient, or even dangerous for a single person to operate, due to the greater length of the bench and the absence of a properly positioned backrest. Additionally, when a single person occupies a two-person seat, the excess space taken up by the elongated seat is generally wasted. Further, it is more difficult to adapt the vehicle for other purposes, for example, carrying cargo with a carrier bed or storage rack, without increasing the general size of the vehicle. Embodiments of the invention can be used to generally overcome the above shortcomings as well as others.

BRIEF SUMMARY

Embodiments of the invention described and illustrated herein provide a vehicle having an adjustable seating assembly comprising one or more members. One member of the seating assembly can be adjusted to provide a backrest to a straddle type seat of the vehicle. As such, when a carrier bed having an accessory platform is located rearward of the straddle type seat, the one member can optionally be used to provide a wall portion of the carrier bed. The one member can also be adjusted to provide an extension to the straddle type seat. As such, when an accessory platform is located rearward of the straddle type seat, the one member can optionally be used to at least partially cover a segment of the accessory platform. When an accessory platform is located rearward of the straddle type seat, an additional member of the seating assembly can be adjusted to provide a backrest to one or more of the straddle type seat or an extended straddle type seat. The additional member can also be adjusted to form a segment of the accessory platform.

In certain embodiments of the invention, a vehicle with an adjustable seating assembly is provided. The vehicle comprises a chassis carrying a straddle type seat, one or more steerable front wheels and two or more rear wheels operatively coupled to the chassis, a steering member for steering the one or more front wheels, an engine carried by the chassis for powering the vehicle, and a cushion located rearward of the straddle type seat. The cushion is adjustable to first and second positions. The cushion in the first position is oriented generally upright with respect to the seat to form a backrest to the straddle type seat. The cushion in the second position is oriented generally flat to form a rearward extension to the straddle type seat.

In certain embodiments of the invention, a vehicle with another adjustable seating assembly is provided. The vehicle comprises a chassis carrying a straddle type seat, one or more steerable front wheels and two or more rear wheels operatively coupled to the chassis, a steering member for steering the one or more front wheels, an engine carried by the chassis for powering the vehicle, and an accessory platform extending rearward of the straddle type seat. The accessory platform includes a pad that is adjustable to first and second positions. The pad is coupled to a support portion having a generally planar back plate. The pad in the first position is oriented generally upright with respect to the accessory platform to form a backrest to the straddle type seat. The pad in the second position orients the mounting surface of the support portion generally flush with a top surface of the accessory platform whereby the back plate forms a segment of the accessory platform.

In certain embodiments of the invention, a vehicle with a further adjustable seating assembly is provided. The vehicle comprises a chassis carrying a straddle type seat, one or more steerable front wheels and two or more rear wheels operatively coupled to the chassis, a steering member for steering the one or more front wheels, an engine carried by the chassis for powering the vehicle, a cushion located rearward of the straddle type seat, and an accessory platform located rearward of the straddle type seat. The cushion is oriented generally upright with respect to the seat to form a backrest to the seat. The accessory platform includes one or more walls extending from a periphery of the accessory platform. The cushion is coupled to a support portion having a generally planar mounting surface, and the support portion forms at least a portion of one of the walls.

In certain embodiments of the invention, a vehicle with an additional adjustable seating assembly is provided. The vehicle comprises a chassis carrying a straddle type seat, one or more steerable front wheels and two or more rear wheels operatively coupled to the chassis, a steering member for steering the one or more front wheels, an engine carried by the chassis for powering the vehicle, a cushion located rearward of the straddle type seat, and an accessory platform located rearward of the straddle type seat. The cushion is oriented generally flat with respect to the straddle type seat to form an extension to the seat. The accessory platform includes a pad that is oriented generally upright with respect to the accessory platform to form a backrest to the extended straddle type seat. The cushion extends onto the accessory platform and at least partially covers an area of the accessory platform used for storing the pad when not being used as a backrest to the extended straddle type seat.

DETAILED DESCRIPTION

The following discussion is presented to enable a person skilled in the art to make and use the present teachings. Various modifications to the illustrated embodiments will be described and should be readily apparent to those skilled in the art, and the generic principles herein may be applied to other embodiments and applications without departing from the present teachings. Thus, the present teachings are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of the present teachings. Skilled artisans will recognize the examples provided herein have many useful alternatives and fall within the scope of the present teachings.

Figure 1:
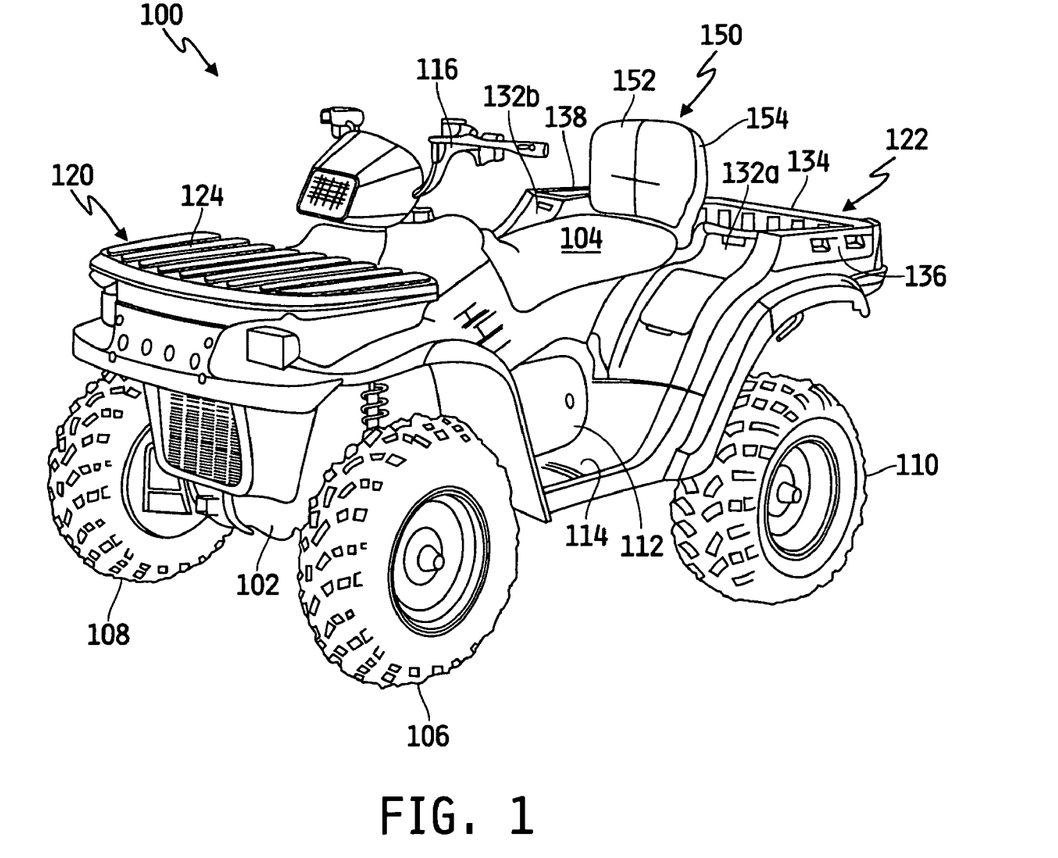
FIG. 1 is a perspective side view of a vehicle in accordance with certain embodiments of the invention.

FIG. 1 is a perspective view of a vehicle 100 in accordance with an exemplary embodiment of the present teachings. The vehicle 100 of FIG. 1 can be generally referred to as an ATV; however, it should be appreciated that embodiments of the invention are applicable to any vehicles generally having straddle type seats such as other recreational or utility vehicles, motorcycles, snowmobiles and the like. The vehicle 100 can have a chassis 102 carrying a straddle type seat 104. In FIG. 1, the straddle type seat 104 is sufficiently narrow to be straddled by a vehicle rider. As shown, the vehicle 100 can have a left front wheel 106, a right front wheel 108, a left rear wheel 110, and a right rear wheel (not visibly shown). The wheels can be operatively coupled to the chassis 102. While not illustrated, it should be appreciated that the vehicle 100 can alternatively have a single front wheel or three or more front wheels instead of the two front wheels 106, 108 shown without departing from the spirit of the invention. Likewise, the vehicle 100 can alternatively have three of more rear wheels or, alternatively, one or more sets of tracks instead of the two rear wheels referenced (as noted above, only the left rear wheel 110 is visibly shown) without departing from the spirit of the invention.

The vehicle 100 can also include an engine 112 that is carried by the chassis 102. The engine 112 can be operatively coupled to any of the wheels on the vehicle 100 via a drive train for propelling the vehicle 100. Accordingly, the engine 112 can be used to power any of the wheels on the vehicle 100. It is fully contemplated that the engine 112 could be a motor or any other apparatus to propel the vehicle 100 without departing from the spirit of the present teachings. The vehicle 100 can include a first footrest 114 that can be seen extending from one side of the chassis 102 in FIG. 1. The vehicle 100 can also include a second footrest (not visibly shown) that extends from the other side of the chassis 102. The vehicle 100 can include a member 116 that may be used for steering the vehicle 100. In certain embodiments, as shown in FIG. 1, the steering member 116 comprises a set of handlebars.

Figure 2:
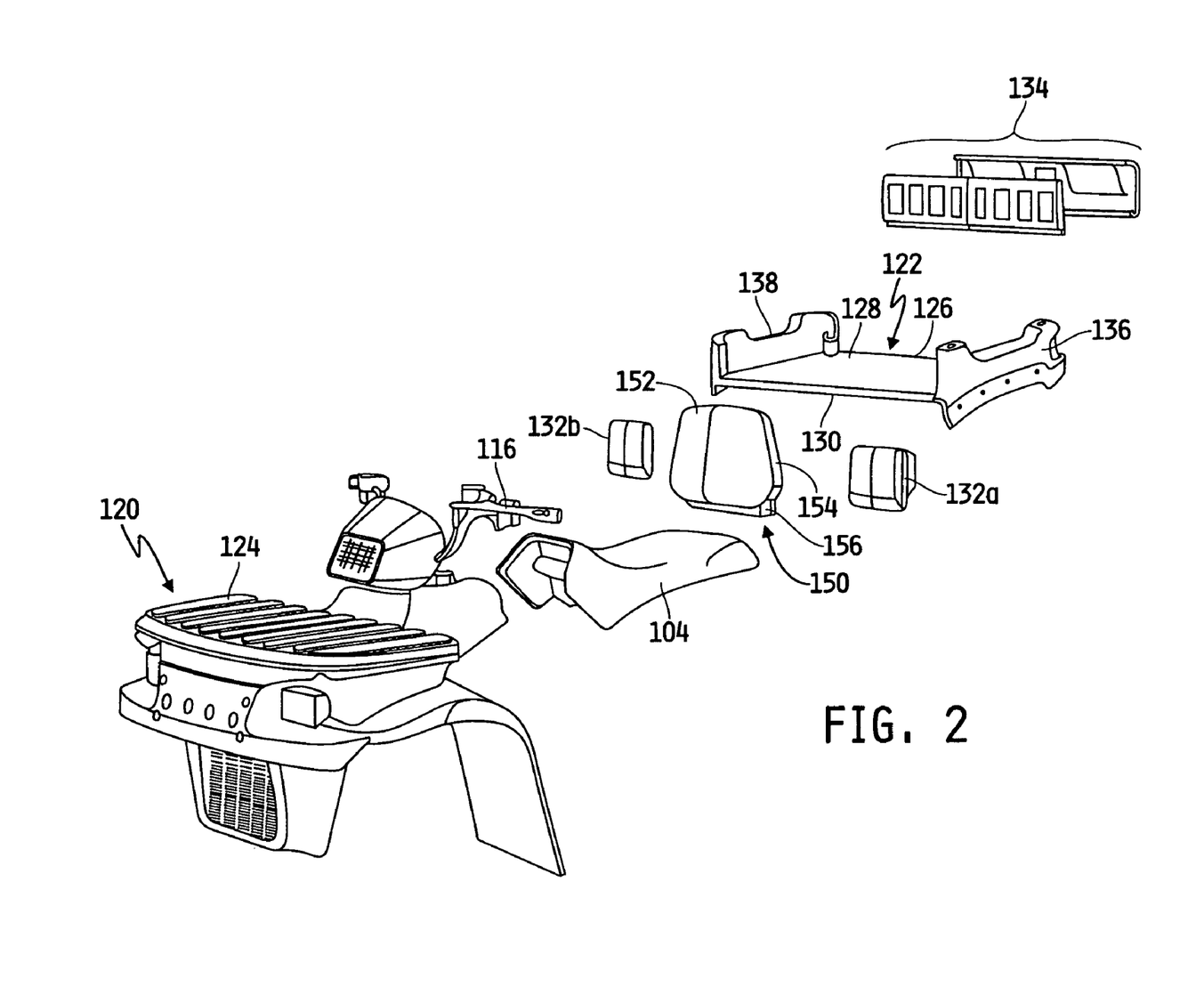
FIG. 2 is an exploded, perspective side view of the front console, the seating assembly, and the carrier bed of the vehicle of FIG. 1.

In certain embodiments, the vehicle 100 includes one or more carrier beds. For example, as shown in FIG. 1, the vehicle 100 can include a first carrier bed 120 and a second carrier bed 122, each of which respectively includes an accessory platform 124 and 126 (accessory platform 126 visibly shown in FIG. 2). As illustrated, the first carrier bed 120 is located forward of the steering member 116 and the second carrier bed 122 is located rearward of the seat 104. As shown in FIG. 2, the accessory platform 126 of the second carrier bed 122 can be oriented to be generally horizontal. The accessory platform 126 has a top surface 128 and a bottom surface 130. In certain embodiments, the top surface 128 is generally flat. While not visible in FIG. 1, it should be appreciated that the bottom surface 130 can be operatively coupled to the chassis 102.

In certain embodiments, as shown, the carrier bed 122 involves a dump box, with vertical members extending from the accessory platform 126 (visibly shown in FIG. 2). In certain embodiments, the vertical members include front wall portions 132a and 132b, a rear wall 134, and side walls 136, 138 extending upward from the periphery of the top surface 128 of the accessory platform 126. In certain embodiments, as illustrated in FIG. 2, one or more of the vertical members can be configured as separately removable members from the accessory platform 126. However, it should be appreciated that the vertical members can alternatively be configured as integral with the accessory platform 126 without departing from the spirit of the invention.

Figure 3:
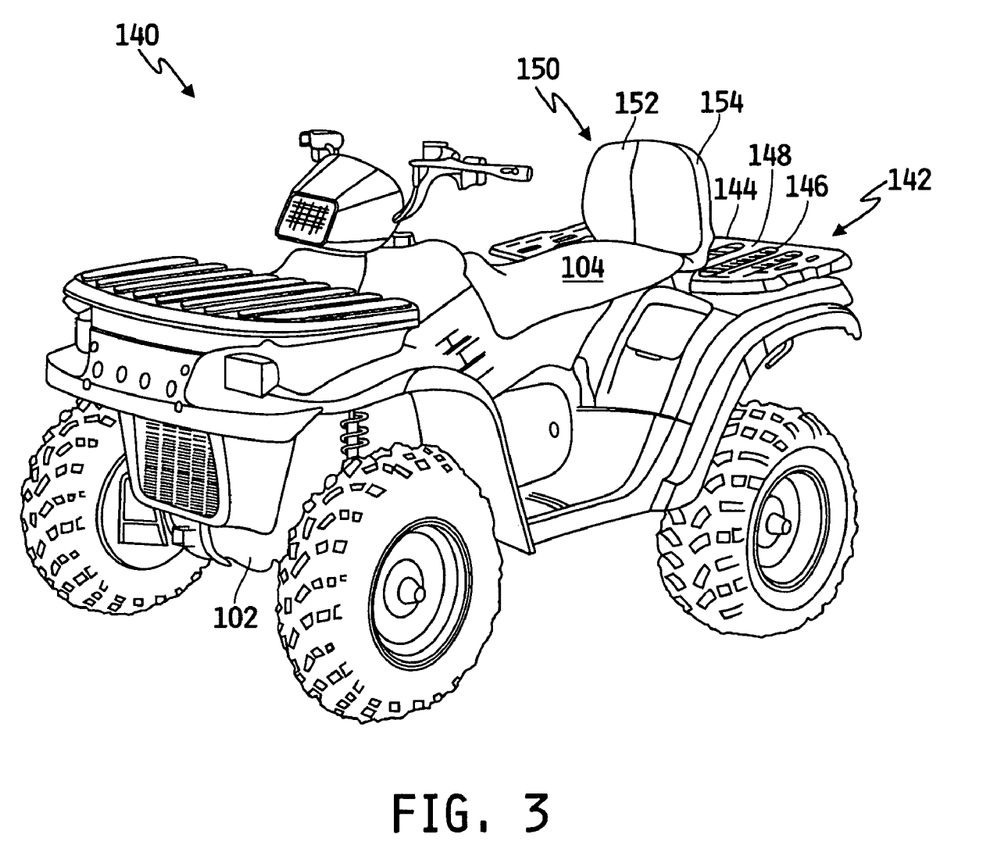
FIG. 3 is a perspective side view of another vehicle in accordance with certain embodiments of the invention.

While certain embodiments described herein involve the vehicle 100 having a rear carrier bed involving a dump box, the invention should not be limited as such. In certain embodiments, the vehicle 100 can be provided with no such carrier bed. Alternatively, the vehicle 100 can be provided with any of a wide variety of carrier beds while still falling within the spirit of the invention; such carrier beds generally being located rearward of the straddle type seat 104 and including an accessory platform. For example, in certain embodiments, as shown in FIG. 3, a vehicle 140 can be provided with a carrier bed 142 located rearward of the straddle type seat 104. The carrier bed 142 includes an accessory platform 144 involving a rack, with at least one mounting aperture 146 extending through a top surface 148 of the accessory platform 144. It is to be further appreciated that describing embodiments herein with respect to vehicle 100 of FIG. 1 (and/or vehicle 140 of FIG. 3) is purely exemplary, and any of a wide variety of vehicles, as mentioned above, can be applicable to the embodiments.

FIGS. 1-3 illustrate an assembly 150 located rearward of the straddle type seat 104. In certain embodiments, the assembly 150 includes a cushion 152 coupled to a support portion 154. The cushion 152 can be similar in structure to a padded portion of the straddle type seat 104, yet, as can be appreciated, reduced in size. The support portion 154 can be a plate made of a rigid material (e.g., plastic and/or metal). The assembly 150 can be operatively coupled to the vehicle 100.

Through such coupling, the assembly 150 can be made to be adjustable with respect to the straddle type seat 104. In certain embodiments, the assembly 150 is operatively coupled to the chassis 102 of the vehicle 100.

It should be appreciated that the assembly 150 can be coupled to the chassis 102 using any one of a variety of different methods and apparatus. For example, in certain embodiments, the coupling involves a channel 156 (shown in FIG. 2) running longitudinally through a lower portion of the support portion 154 and a rod (not shown) that extends through the channel 156 with outer ends of the rod being held captive within apertures of the chassis 102 (not shown). As such, the assembly 150 can be made to pivot about this coupling between the support portion 154 and the chassis 102 so as to enable adjustment of the assembly 150 to different positions. It is to be appreciated that such coupling example is purely exemplary, and should not be viewed as a limitation to the invention.

As shown in FIG. 1, the assembly 150 can be adjusted to a first position so that the cushion 152 is generally oriented upright with respect to the straddle type seat 104, with the cushion 152 facing toward the operator of the vehicle 100. As such, the assembly 150 in this first position functions in providing lumbar support to an operator of the vehicle 100. Once adjusted to a position, e.g., the first position, it should be appreciated that the assembly 150 can be held and/or locked in place using any one of a variety of different methods and apparatus. For example, adjustable retainers (not shown) can be operatively coupled to the chassis 102 and located proximate to opposing sides of a lower portion of the support portion 154. As such, when the assembly 150 is adjusted to the first position, the retainers can be adjusted to contact rear (and optionally front) surfaces of the lower portion of the support portion 154, thereby holding and/or locking the support portion 154 in place. It is to be appreciated that using retainers to hold and/or lock the assembly 150 in this fashion is purely exemplary, and should not be viewed as a limitation to the invention.

As shown in FIG. 1, the carrier bed 122 located rearward of the straddle type seat 104 can be disposed on the vehicle 100 so as to be at a certain vertical height in order to function with the assembly 150. In certain embodiments, when set in its first position, the assembly 150 is used to bridge the space between the front wall portions 132*a*, 132*b* of the carrier bed 122. As such, the assembly 150, in addition to providing support to the operator via the cushion 152, can aid in forming a portion of a front wall for the carrier bed 122 via the support portion 154 and the front wall portions 132*a*, 132*b*. While not shown, it should be appreciated that the assembly 150 can alternatively be oriented forward of the carrier bed 122 when the assembly 150 is adjusted to its first position. In turn, the assembly 150 would not aid in forming a front wall for the carrier bed 122. Instead, a one-piece front wall could be provided instead of the front wall portions 132*a*, 132*b* to generally provide a continuous wall around the entire periphery of the carrier bed 122. Alternatively, a front wall portion can be provided to bridge the space between the front wall portions 132*a*, 132*b* to provide a continuous wall around the entire periphery of the carrier bed 122.

Figure 4:
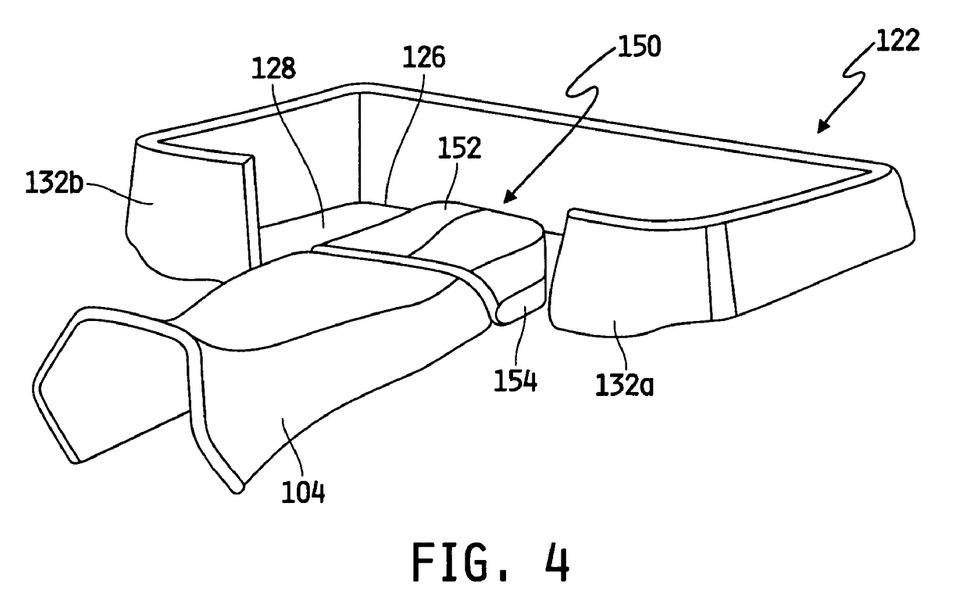
FIG. 4 is a perspective side view of the seating assembly and the carrier bed of FIG. 1.

In certain embodiments, the assembly 150 can be adjusted to a second position with respect to the straddle-type seat 104 so that the cushion 152 is oriented generally flat to form a rearward extension to the seat 104. This second position of the assembly 150 is illustrated in FIG. 4 with respect to the straddle type seat 104, the assembly 150, and the carrier bed 122 of FIGS. 1 and 2. In the second position, the assembly 150, with cushion 152 oriented up, can be used to generally provide an elongation of the seat 104 to accommodate an additional rider on the vehicle 100. In certain embodiments, as shown in FIG. 4, when adjusted to the second position, the assembly 150 can partially extend into the carrier bed 122 and onto the accessory platform 126. With respect to FIG. 2, no modifications to the carrier bed 122 are needed as the assembly 150 can extend between the front wall portions 132*a*, 132*b* of the carrier bed 122. It should be appreciated that if the carrier bed 122 instead involved a design including a continuous front wall (as described above), the continuous front wall, or alternatively a middle section of the continuous front wall, would need to be removed to enable the cushion 152 to be oriented generally flat.

Figure 5:
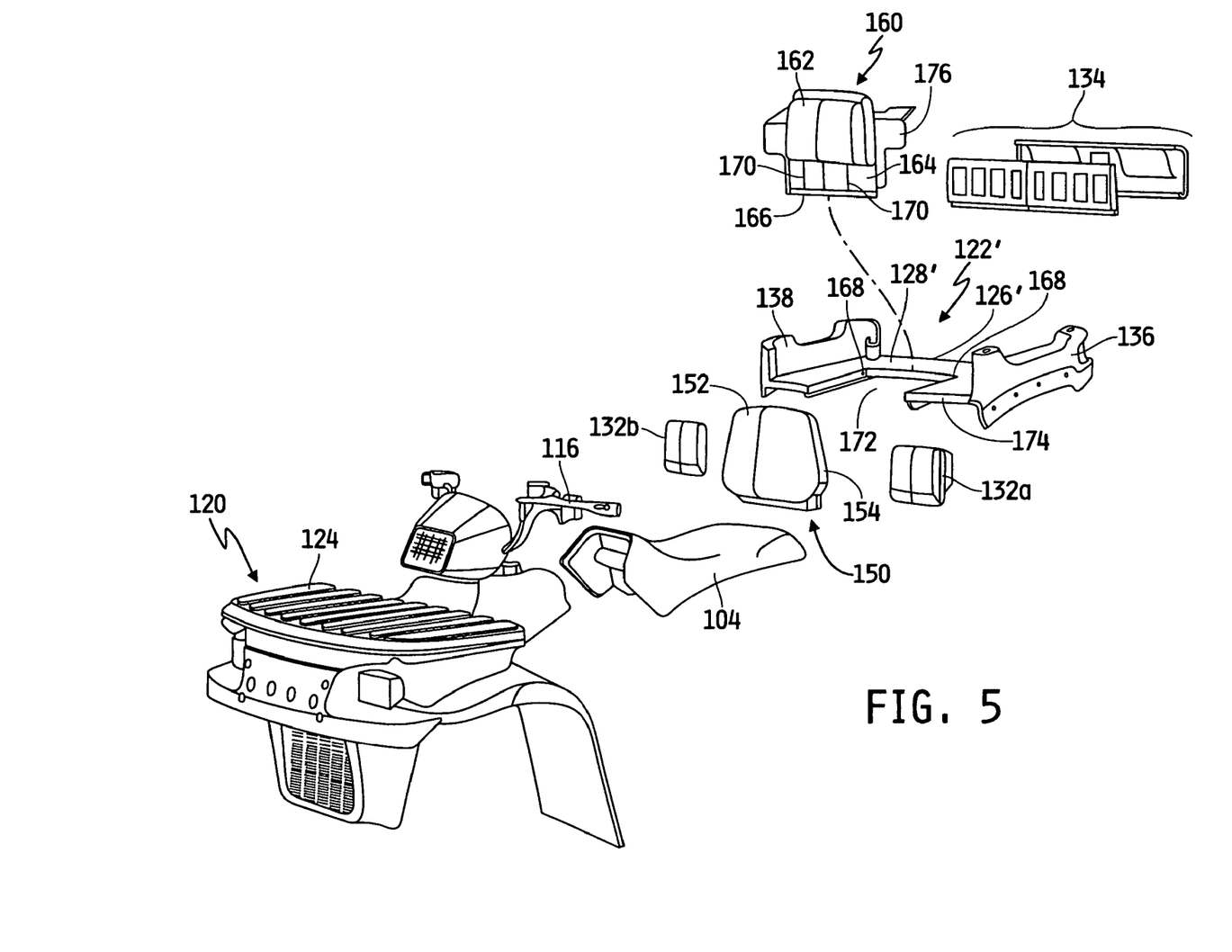
FIG. 5 is an exploded, perspective side view of the front console and the seating assembly of the vehicle of FIG. 1, with an alternate carrier bed.
Figure 6:
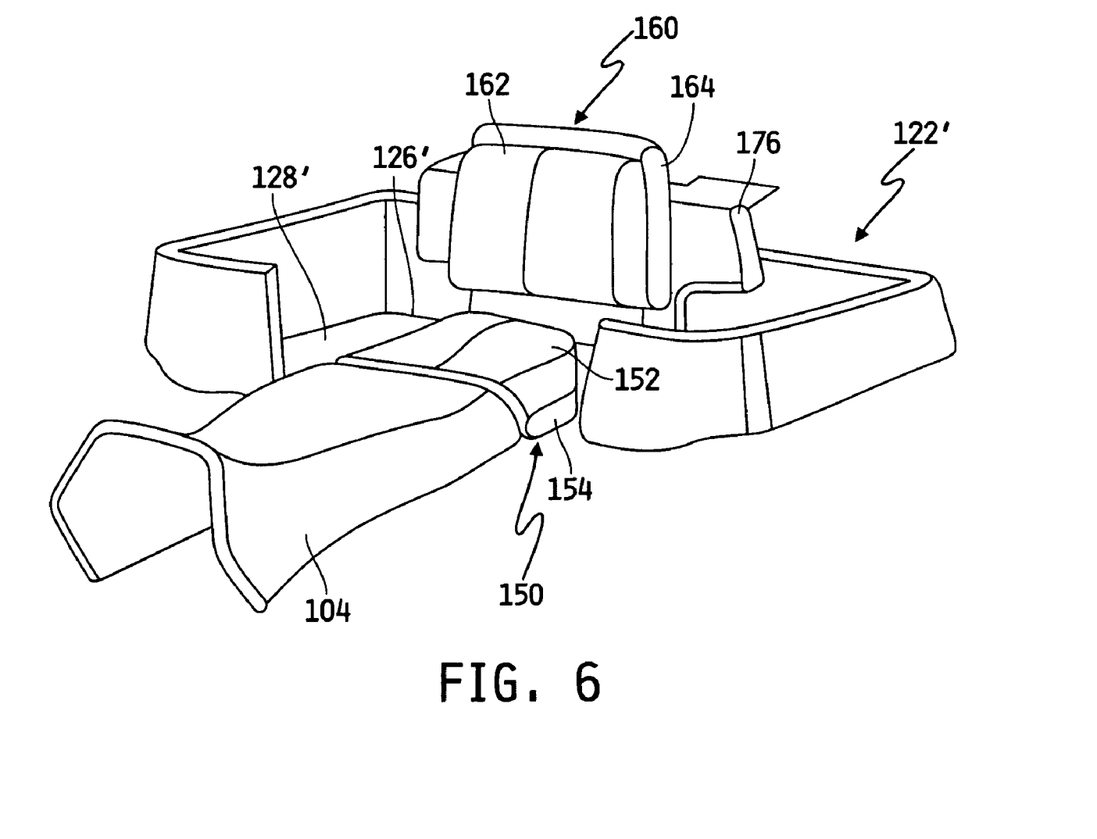
FIG. 6 is a perspective side view of the seating assembly and the carrier bed of FIG. 5.
Figure 7:
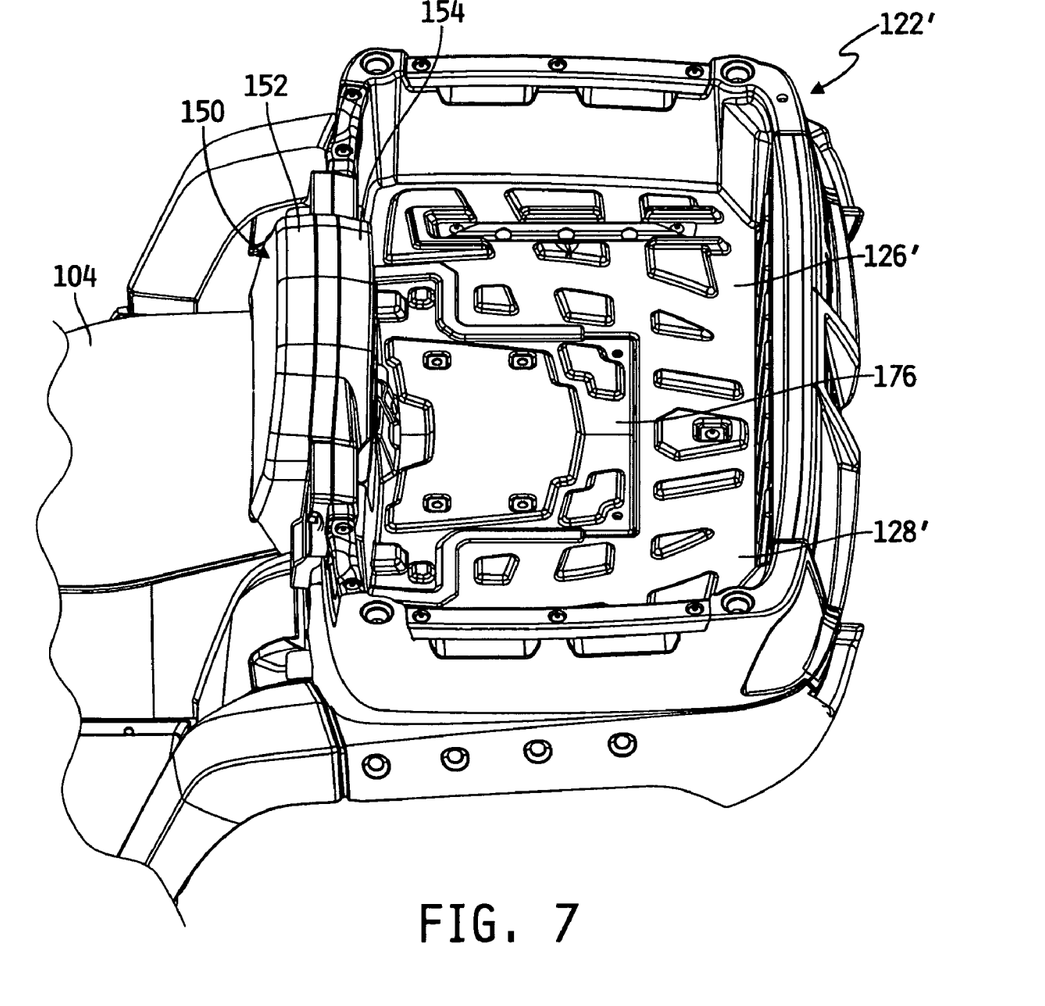
FIG. 7 is perspective top view of the seating assembly and the carrier bed of FIG. 5.

As shown in FIGS. 5-7, a carrier bed 122' is provided having an accessory platform 126'. The carrier bed 122' is illustrated in FIGS. 5-7 with respect to the straddle type seat 104 and the assembly 150 of FIGS. 1-3. As such, the carrier bed 122' can be used as an alternative to the carrier bed 122 on the vehicle 100 of FIG. 1. In certain embodiments, as shown in FIG. 5, the carrier bed 122' involves a dump box, with vertical members extending from the accessory platform 126'. In certain embodiments, the vertical members include front wall portions 132*a* and 132*b*, a rear wall 134, and side walls 136, 138 extending upward from the periphery of the top surface 128 of the accessory platform 126'. In certain embodiments, as illustrated in FIG. 5, one or more of the vertical members can be configured as separately removable members from the accessory platform 126'. However, it should be appreciated that the vertical members can alternatively be configured as integral with the accessory platform 126' without departing from the spirit of the invention.

In certain embodiments, as illustrated in FIGS. 5 and 6, the carrier bed 122' includes a structure 160. In certain embodiments, the structure 160 includes a pad 162 coupled to a support portion 164. The pad 162 can be similar in structure to a padded portion of the straddle type seat 104, yet, as can be appreciated, reduced in size. The support portion 164 can be a plate made of a rigid material (e.g., plastic and/or metal). In certain embodiments, the structure 160 is operatively coupled to the accessory platform 126' of the carrier bed 122'. Through such coupling, the structure 160 can be made to be adjustable with respect to the accessory platform 126'.

It is to be appreciated that the structure 160 can be coupled to the accessory platform 126' using any one of a variety of different methods and apparatus. For example, in certain embodiments, the coupling involves a channel 166 (shown in FIG. 5) running longitudinally through a lower portion of the support portion 164 and a rod (not shown) that extends through the channel 166 with outer ends of the rod being held captive within apertures 168 of the accessory platform 126'. As such, the structure 160 can be made to pivot about this coupling between the support portion 164 and the accessory platform 126' so as to enable adjustment of the structure 160 to different positions. It is to be appreciated that such coupling example is purely exemplary, and should not be viewed as a limitation to the invention.

As shown in FIG. 6, the structure 160 can be adjusted to a first position so that the pad 162 is generally oriented upright with respect to the accessory platform 126' with the pad 162 facing toward the operator of the vehicle 100. In certain embodiments, as shown, the assembly 150 is additionally included rearward of the straddle type seat 104, as described above. The assembly 150 can be positioned in its second position (as described above) so that the cushion 152 is oriented generally flat with respect to the straddle type seat 104 to form an extension to the seat 104. As such, when the structure 160 is adjusted to its first position, the pad 162 can form a backrest to the extended seat (involving the straddle type seat 104 and the assembly 150). In turn, the structure 160 in this first position can function in providing lumbar support to a rider accommodating the extended seat of the vehicle 100. In certain embodiments, as shown in FIG. 5, the pad 162 can be adjusted upward and downward as desired on the support portion 164. It should be appreciated that this vertical adjustment of the pad 162 can be provided using any of a number of mechanisms. For example, as shown, one or more tracks 170 can be located on the support portion 164 and function with sliding members (not visibly shown) on the pad 162 to enable such adjustment.

Once adjusted to a position, e.g., the first position, it should be appreciated that the structure 160 can be held and/or locked in place using any one of a variety of different methods and apparatus. For example, adjustable retainers (not shown) can be operatively coupled to the accessory platform 126' and located proximate to opposing sides of a lower portion of the support portion 164. As such, when the structure 160 is adjusted to the first position, the retainers can be adjusted to contact rear (and optionally front) surfaces of the lower portion of the support portion 164, thereby holding and/or locking the support portion 164 in place. It is noted that using retainers to hold and/or lock the structure 160 in this fashion is purely exemplary, and should not be viewed as a limitation to the invention.

In reference to FIG. 5, it should be appreciated that the structure 160 could be made further adjustable with respect to the accessory platform 126'. For example, in certain embodiments, the structure 160 could be uncoupled from the accessory platform 126', moved forward so that the structure 160 is positioned directly rearward of the straddle type seat 104, and then subsequently re-coupled to the accessory platform 126'. As such, with the structure 160 relocated with respect to the straddle type seat 104 and subsequently set in its first position, the pad 162 can form a backrest for the operator. In turn, such vehicle designs would no longer require the assembly 150 for providing a backrest for the operator. In addition, when adjusted as described above, the structure 160 can be optionally further used to bridge the space between the front wall portions 132a, 132b of the carrier bed 122'. As such, the structure 160, in addition to providing support to the operator via the pad 162, could aid in forming a portion of a front wall for the carrier bed 122' via the support portion 164 and the front wall portions 132a, 132b.

In certain embodiments, the structure 160 can be adjusted to a second position with respect to the accessory platform 126'. This second position of the structure 160 is illustrated in FIG. 7, and involves the structure 160 being incorporated with the accessory platform 126' to form a segment 172 of the accessory platform 126'. In certain embodiments, as shown in FIG. 5, the segment 172 is rearward of the straddle type seat 104 and extends rearward from a front portion 174 of the accessory platform 126'. In the second position, the structure 160 can be oriented generally flat, with the pad 162 facing down and the support portion 164 facing up. In certain embodiments, as shown in FIGS. 5-7, the support portion 164 includes a generally planar back plate 176. The back plate 176 is located on the support portion 164 opposite the pad 162 and can be made of a rigid material (e.g., plastic and/or metal). As illustrated in FIG. 7, in the second position, the back plate 176 of the support portion 164 can be oriented to be generally flush with a top surface 128' of the accessory platform 126', whereby the back plate 176 forms the segment 172 of the accessory platform 126'.

As can be appreciated, when the structure 160 is adjusted from its second position (being generally flat with respect to the accessory platform 126') to its first position (being generally upright with respect to the accessory platform 126'), the accessory platform 126 is left with an unoccupied area at the segment 172 (shown in FIG. 5). However, when the assembly 150 is adjusted from its first position (being generally upright with respect to the straddle type seat 104) to its second position (being generally flat with respect to the straddle type seat 104), the assembly 150 (via the cushion 152 and the support portion 154) can be used to at least partially fill and/or cover the unoccupied area at the segment 172. As such, the assembly 150, in its second position, in addition to providing an extension to the straddle type seat 104, can aid in filling and/or covering the unoccupied area at the segment 172.

It will be appreciated the embodiments of the invention can take many forms. The true essence and spirit of the embodiments of the invention are defined in the appended claims, and it is not intended the embodiment of the invention presented herein should limit the scope thereof.

What is claimed is:

1. A vehicle with an adjustable seating assembly, comprising:
   a chassis carrying a straddle type seat;
   one or more steerable front wheels and two or more rear wheels operatively coupled to the chassis;
   a steering member for steering the one or more front wheels;
   an engine carried by the chassis for powering the vehicle; and
   a cushion located rearward of the straddle type seat and adjustable to first and second positions, the cushion in the first position being oriented generally upright with respect to the seat to form a backrest to the straddle type seat, the cushion in the second position being oriented generally flat to form a rearward extension to the straddle type seat wherein the straddle type seat defines a first seating surface for a first rider and the cushion defines a second seating surface for a second rider.

2. The vehicle of claim 1, wherein the cushion is coupled to a support portion that is operatively coupled to the chassis through a coupling.

3. The vehicle of claim 2, wherein the cushion is adjustable between the first and second positions by pivoting about the coupling joining the support portion and the chassis.

4. The vehicle of claim 2, wherein the support portion is a plate comprised of rigid material.

5. The vehicle of claim 1, further comprising an accessory platform located rearward of the seat, wherein the accessory platform includes at least one wall extending from a periphery thereof.

6. The vehicle of claim 5, wherein the cushion in the first position forms at least a portion of the at least one wall.

7. The vehicle of claim 5, wherein the cushion in the second position partially extends onto the accessory platform.

8. The vehicle of claim 5, wherein the cushion in the second position extends between two portions of the at least one wall at the front periphery of the accessory platform.

9. The vehicle of claim 1, further comprising a structure located rearward of the cushion and configured to be oriented generally upright with respect to the cushion when the cushion is in the second position to form a backrest to the cushion for the second rider.

10. A vehicle with an adjustable seating assembly, comprising:
    a chassis carrying a straddle type seat;
    one or more steerable front wheels and two or more rear wheels operatively coupled to the chassis;

a steering member for steering the one or more front wheels;

an engine carried by the chassis for powering the vehicle; and an accessory platform including a front portion and extending rearward of the straddle type seat, the accessory platform including a pad that is adjustable to first and second positions, the pad coupled to a support portion having a generally planar back plate, the pad in the first position being oriented generally upright with respect to the accessory platform to form a backrest to the straddle type seat, the pad in the second position orienting the back plate of the support portion generally flush with a top surface of the accessory platform whereby the back plate forms a segment of the accessory platform, the segment extending rearward from the front portion.

11. The vehicle of claim 10, wherein the straddle type seat is adapted to accommodate two persons.

12. The vehicle of claim 10, wherein the straddle type seat partially extends onto the accessory platform.

13. The vehicle of claim 10, wherein the pad is adjustable between the first and second positions by pivoting about a coupling joining the support portion and the accessory platform.

14. The vehicle of claim 10, wherein the straddle type seat partially covers the support portion when the pad is adjusted to the second position.

15. The vehicle of claim 10, wherein an opening is defined within the accessory platform when the pad is in the first position, and the back plate is received within the opening when the pad is in the second position.

16. The vehicle of claim 10, further comprising a cushion located rearward of the straddle type seat and adjustable to first and second positions, the cushion in the first position being oriented generally upright with respect to the straddle type seat to form a backrest to the straddle type seat, the cushion in the second position being oriented generally flat to form a rearward extension to the straddle type seat.

17. The vehicle of claim 16, wherein:

an opening is defined within the accessory platform when the pad is in the first position, and the back plate is received within the opening when the pad is in the second position; and the cushion in the second position at least partially fills the opening defined within the accessory platform when the pad is in the first position.

18. A vehicle with an adjustable seating assembly, comprising:

a chassis carrying a straddle type seat;

one or more steerable front wheels and two or more rear wheels operatively coupled to the chassis;

a steering member for steering the one or more front wheels;

an engine carried by the chassis for powering the vehicle;

a cushion located rearward of the straddle type seat and oriented generally upright with respect to the seat to form a backrest to the seat, the cushion coupled to a support portion having a generally planar mounting surface; and an accessory platform located rearward of the straddle type seat, the accessory platform including one or more walls extending from a periphery of the accessory platform, the support portion forming at least a portion of one of the walls.

19. The vehicle of claim 18, wherein the cushion is adjustable to at least two positions, wherein the cushion is oriented generally flat with respect to the straddle type seat to form an extension to the seat in one of the at least two positions.

20. The vehicle of claim 19, wherein the cushion when adjusted to the one of the at least two positions generally extends onto the accessory platform.

21. The vehicle of claim 19, wherein the accessory platform includes a pad that is adjustable to at least two positions, wherein the pad is oriented generally upright with respect to the accessory platform to form a backrest to the extended straddle type seat in one position.

22. The vehicle of claim 18, wherein the vehicle is an all terrain vehicle.

23. A vehicle with an adjustable seating assembly, comprising:

a chassis carrying a straddle type seat;

one or more steerable front wheels and two or more rear wheels operatively coupled to the chassis;

a steering member for steering the one or more front wheels;

an engine carried by the chassis for powering the vehicle;

a cushion located rearward of the straddle type seat, the cushion oriented generally flat with respect to the straddle type seat to form an extension to the seat; and an accessory platform located rearward of the straddle type seat, the accessory platform including a pad, the pad oriented generally upright with respect to the accessory platform to form a backrest to the extended straddle type seat, the cushion extending onto the accessory platform and at least partially covering an area of the accessory platform used for storing the pad when not being used as a backrest to the extended straddle type seat.

24. The vehicle of claim 23, wherein the area of the accessory platform is rearward of the straddle type seat and extends from a front portion of the accessory platform.

* * * * *